United States Patent [19]

Kane

[11] Patent Number: 4,494,462
[45] Date of Patent: Jan. 22, 1985

[54] THAW SHED HEATER

[75] Inventor: John J. Kane, Erie, Pa.

[73] Assignee: The Pittsburgh & Conneaut Dock Company, Conneaut, Ohio

[21] Appl. No.: 385,028

[22] Filed: Jun. 4, 1982

[51] Int. Cl.³ .................... B61B 12/00; B61D 27/00; F24C 3/00

[52] U.S. Cl. .................... 104/1 R; 104/51; 104/279; 105/451; 126/19.5; 126/56; 126/59.5; 126/91 A; 126/92 AC; 126/343.5 R; 246/428; 432/225; 432/226

[58] Field of Search .................... 104/1 R, 51, 279; 126/19.5, 59, 59.5, 91 A, 92 AC, 343.5 A, 343.5 R, 56; 246/428; 432/225, 226; 105/451

[56] References Cited

U.S. PATENT DOCUMENTS

| | | | |
|---|---|---|---|
| 869,987 | 11/1907 | Shaw | 246/428 |
| 2,122,154 | 6/1938 | Reynolds | 246/428 |
| 2,489,874 | 11/1949 | Elze et al. | 104/51 |
| 2,598,293 | 5/1952 | Parker et al. | 104/1 |
| 3,061,703 | 10/1962 | Barber | 246/428 X |
| 3,513,779 | 5/1970 | Aitken | 104/1 |
| 3,536,909 | 10/1970 | Czyl | 246/428 |
| 3,800,858 | 4/1974 | Placek | 104/1 X |
| 3,964,465 | 6/1976 | Diggs | 126/59.5 X |

Primary Examiner—Robert B. Reeves
Assistant Examiner—Howard Beltran
Attorney, Agent, or Firm—John F. Carney

[57] ABSTRACT

Heating apparatus is described that is particularly adapted for thawing frozen particulate material in railroad hopper cars. The apparatus is a low profile, fuel-fired heater adapted for installation between rails traversed by the hopper cars within a thawing shed. The construction employs heat-radiating metal plates forming an elongated gas-conducting chamber through which high velocity combustion gases are conducted. The arrangement of plates is such as to enhance the emission of radiant heat to the hopper car bottoms with appropriately positioned heat insulated regions to protect hopper car brake hoses, or the like, from damage caused by overheating.

11 Claims, 6 Drawing Figures

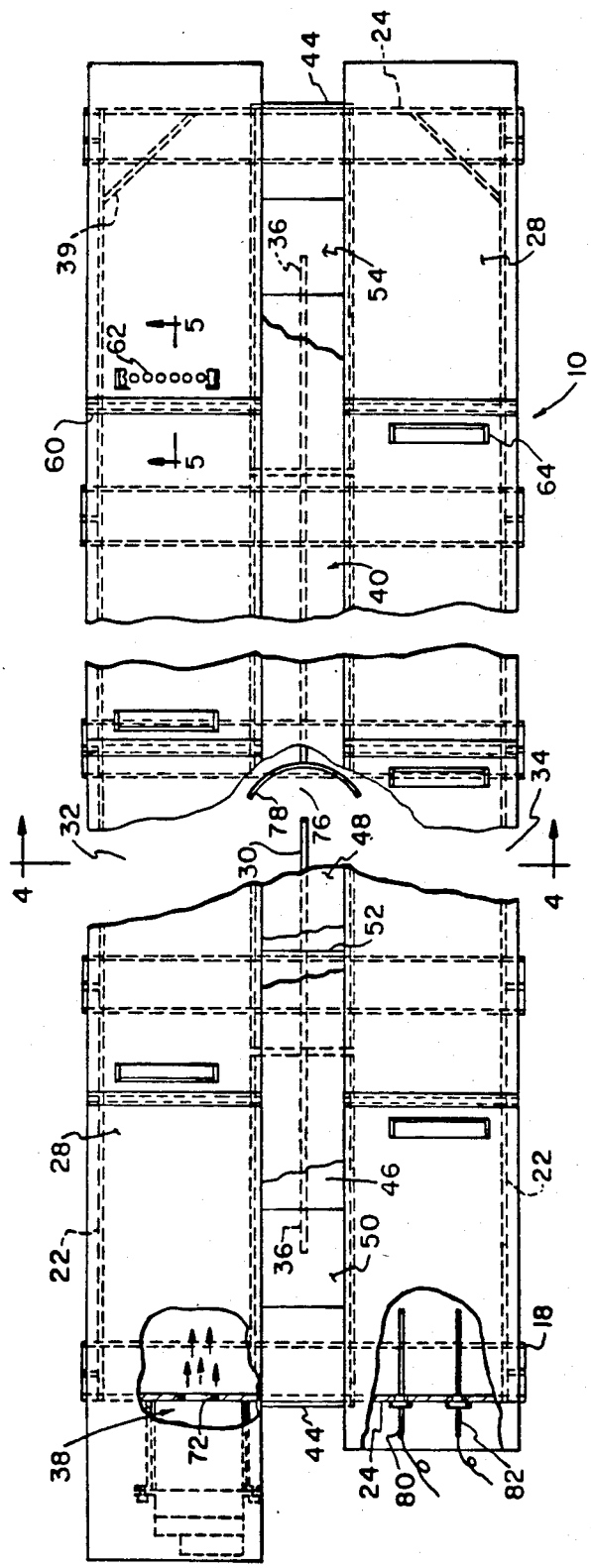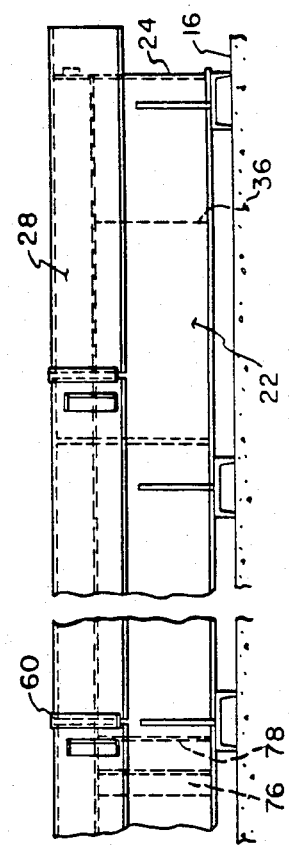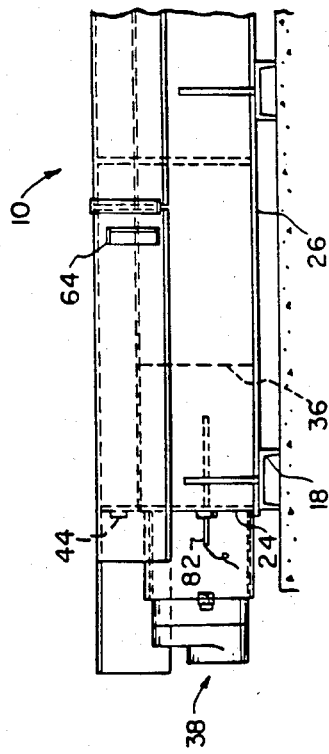
FIGURE 2
FIGURE 3

THAW SHED HEATER

BACKGROUND OF THE INVENTION

The present invention relates to heating apparatus particularly adapted for thawing frozen particulate material in railway hopper cars in order to facilitate off-loading of the material.

Particulate material such as coal, coke, iron ore, gravel and sand, or the like, are economically bulk transported in large, open-topped hopper cars from whence they are off-loaded at a point of storage or of use, either from bottom openings in the cars or by means of car dumpers that invert the entire car. Off-loading of such moisture-laden material is rendered difficult in colder climates due to freezing of the load during transit or while standing on the railroad.

Various forms of heating apparatus have heretofore been employed to thaw frozen hopper car loads to permit ready discharge of their contents. Such apparatus have included fuel-fired thawing pits, typified by U.S. Pat. No. 2,598,293, granted May 27, 1952 to Parker, et al, that are located in the rail bed and over which the car to be thawed is positioned. Apparatus of this type is costly to install requiring excavation and shoring of the rail bed. It is also costly to maintain and to operate since the heating pits form receptacles that rapidly accumulate debris which must be constantly cleared in order for the heater to perform effectively.

Other forms of heaters utilized in similar applications include electrically operated radiant heaters, such as those shown and described in U.S. Pat. Nos. 3,513,779, granted May 26, 1970 to Aitken and 3,800,858 granted Apr. 2, 1974 to Placek. Such heaters being electrically operated are extremely costly to operate and require constant maintenance to insure that the heating coils and associated reflective surfaces remain clean.

Units comprising a plurality of small gas heaters employing exposed heat tubes that deliver heat in localized regions have also been tried but these are costly to install and are prone to damage by debris and moisture from the railcars thereby also rendering them costly to maintain.

Several of the aforementioned thawing heater apparatus are further undesirable in that they subject the pneumatic brake hoses and couplings which extend between cars to excessive heat causing deterioration and failure of this equipment resulting in costly repair and replacement.

It is to the amelioration of the aforementioned problems, therefore, that the present invention is directed.

SUMMARY OF THE INVENTION

According to the invention, there is provided heating apparatus for disposition on a railbed between rails supported thereon, comprising generally rectangularly arranged metal plates including heat radiating cover plates defining an elongated, substantially closed chamber adapted for reception between said rails, a fuel-fired burner communicating with said chamber for combustion of fuel therein, means in said chamber for directing combustion gases generated by said burner longitudinally of said chamber, and gas discharge openings disposed at longitudinally spaced locations for discharging heated combustion gases outwardly from said chamber.

It is, accordingly, a principal object of the invention to provide heater apparatus capable of thawing a frozen mass of particulate material in a hopper car more efficiently and economically than heretofore possible.

It is another object of the invention to provide an improved thawing heater that is inexpensive to construct, erect, remove and maintain and that more effectively utilizes the heat of combustion in order to maintain reduced fuel costs as compared with comparable prior art equipment.

Another object of the invention is to provide a thawing heater apparatus in which localized elevated temperature zones are eliminated and a more uniform release of heat is obtained over a greater area.

Still another object of the invention is to provide a heater of the described type that is immune to conditions of vibration, thermal expansion and continued exposure to moisture and contaminants.

Yet another object of the invention is to provide thawing heater apparatus from which radiant heat transfer to a hopper car bottom is enhanced, rather than reduced, by its extended use in a dirty environment.

For a better understanding of the invention, its operating advantages and the specific objectives obtained by its use, reference should be made to the accompanying drawings and description which relate to a preferred embodiment thereof.

BRIEF DESCRIPTION OF THE DRAWINGS

FIG. 2 is a plan view of the heater apparatus of FIG. 1;

FIG. 3 is an elevational side view of the heater apparatus of FIG. 1;

DESCRIPTION OF A PREFERRED EMBODIMENT OF THE INVENTION

Figure 6:
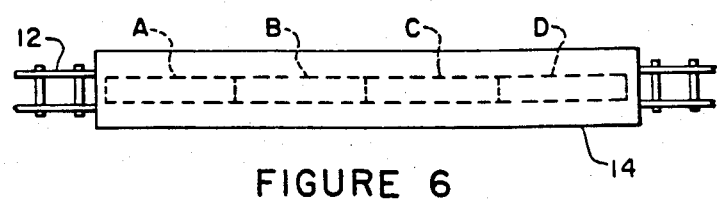
FIG. 6 is a schematic representation of a hopper car thawing shed illustrating an effective zone-controlled utilization of the heater apparatus of the present invention.

The drawing figures illustrate railroad car heating apparatus 10 constructed according to the present invention and adapted for installation between rails 12 traversed by railroad cars within a thaw shed 14 (FIG. 6). In a typical installation a plurality of such heating apparatus 10 are disposed in end-to-end relation extending the full length, or only part way through a thaw shed 14 and are preferably arranged in zones therein for control purposes as described hereinafter. For the purpose of this disclosure, however, only one such heating apparatus 10 is described.

Figure 1:
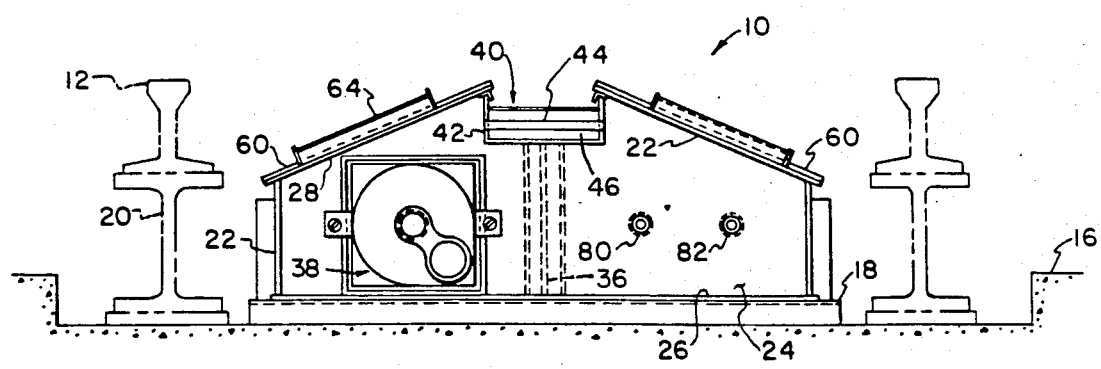
FIG. 1 is an end view of thawing heater apparatus constructed according to the invention shown positioned between the rails in a hopper car thawing shed.

With particular reference to FIGS. 1 through 4, the heating apparatus 10 is arranged for installation on the foundation floor 16 of a typical thaw shed 14, being supported thereon upon channel members 18 extending transversely between rails 12. As shown in FIG. 1, in the described installation the rails 12 may be vertically supported upon support members 20 in order to maintain sufficient clearance space between the heater apparatus 10 and the bottoms of cars that traverse the rails.

The heating apparatus 10 is constructed of a plurality of metal plates including rectangularly disposed side and end wall plates, 22 and 24 respectively, that are upstanding from a bottom or floor plate 26 and weldedly joined to form a substantially integral structure. Alternatively, the structure may be formed in two longitudinally spaced parts that are joined by a leak-proof connection capable of compensating for thermal expansion. An arrangement of removable cover plates 28 form a roof over the structure thereby defining an elongated, substantially closed chamber.

Upstanding from and axially disposed with respect to the floor plate 26 is a longitudinally extending partition plate 30 that divides the chamber into parallel, coextensive passages, 32 and 34. As shown best in FIG. 2, the ends 36 of the partition plate 30 are spaced from the apparatus end walls 24 so as to interconnect the passages 32 and 34 for recirculating flow of combustion gas generated by a burner 38. Angularly disposed baffle plates 39 at one end of the chamber serve to direct the flow of combustion gas between the passages 32 and 34.

The invention contemplates a heating apparatus in which heat is transferred principally, although not entirely, by radiation. Consequently, the cover plates 28 forming the roof are designed for effective emission of radiant and convective heat and are, therefore, preferably formed of a material having high temperature resistance and high heat emissivity characteristics. The plates 28 are disposed in end-to-end relation in rows that overlie each of the respective gas flow passages 32 and 34.

In order to protect sensitive members of the railroad cars to be heated, such as brake hoses and the like, that are positioned in a central position between interconnected cars, from the damaging effects of heat as a string of cars traverses the thaw shed over heaters 10, a heat-insulated seam 40 is advantageously provided between the aforementioned rows of cover plates 28. This seam 40 is defined by a formed metal plate or an assemblage of plates mounted along the upper edge of the partition plate 30 and defining an upwardly open trough 42 whose opposite ends are closed by transverse bars 44. Within the trough 42 is a body of heat insulating material, preferably courses of fired refractory brick 46 that may be covered, for sealing purposes, by a coating 48 of refractory cement. In order to accommodate differential thermal expansion of the trough-forming plates and the partition plate 30, these plates are arranged in sections, designated as 50, 52 and 54 in FIG. 2, that are disposed in slightly spaced relation from one another.

Figure 4:
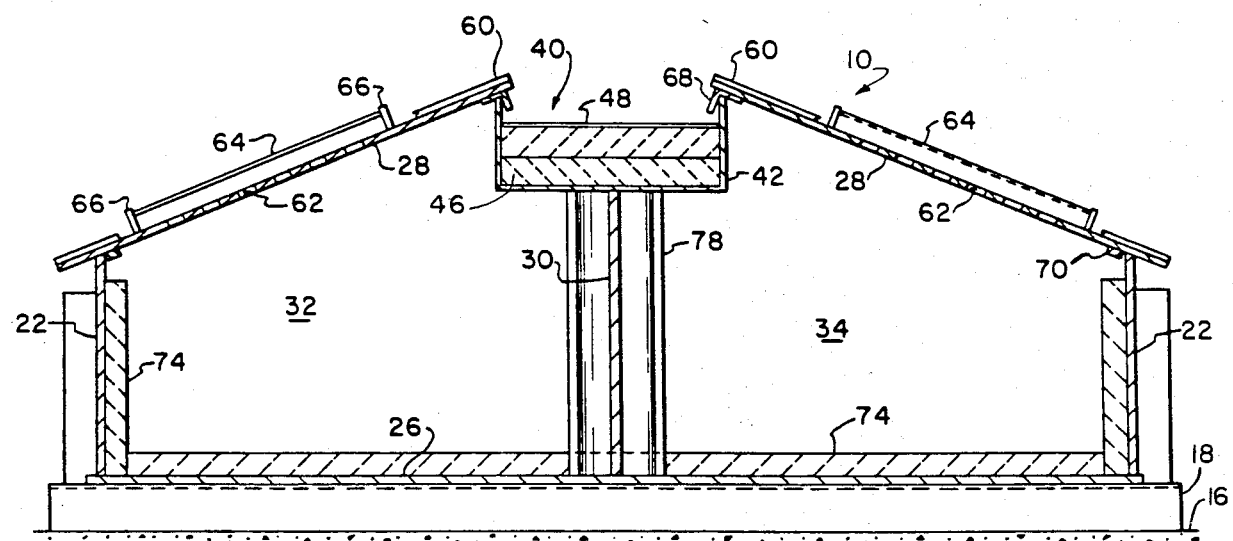
FIG. 4 is a somewhat enlarged elevational section of the heater apparatus of FIG. 1 taken along line 4—4 of FIG. 2.
Figure 5:
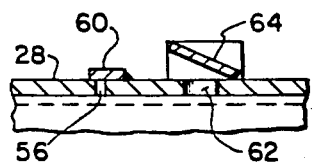
FIG. 5 is a partial sectional view of a typical combustion gas vent opening in a roof plate of the described apparatus taken along line 5—5 of FIG. 2.

Each row of cover plates 28 on opposite sides of the seam 40 includes a plurality of elongated, flat plates arranged in end-to-end, spaced relation with the spaces 56 (FIG. 5) between adjacent plates covered by a seal bar 60 that is welded to one of the adjacent plates in order to accommodate thermal elongation therebetween while effecting a combustion gas seal when the heating apparatus is in operation. As shown in FIGS. 1 and 4, the plates 28 in each row are caused to extend across the respective chambers 32 and 34, being releasably supportively mounted along their opposite side edges to the troughforming plates 42 and to the side walls 22. Such mounting is advantageously effected as shown in FIG. 4 by an angle member 68 and bar 70 welded along the respective sides of the plates, with the former engaging the adjacent plate 42 and the latter engaging the wall 22. The arrangement is such as to cause the cover plates 28 to be inclined downwardly from the central axis of the apparatus thereby effectively preventing the accumulation of debris that might reduce the heat-radiating effectiveness of the plates. The described seal bars 60 and angles 68 also serve to strengthen the plate against thermal distortion.

The cover plates 28 are each further provided with gas discharge openings 62 sized to release only a portion of the combustion gases generated by burner 38 and flowing within the apparatus 10. By disposing these openings at longitudinally spaced locations along the roof of the apparatus, the thawing effect produced by the radiant heat transmitted by the plates 28 is supplemented by the convective effect of the released gases. The release of gases through the openings 62 is directionally controlled by the provision of a flow-directing baffle 64 end-supported by end plates 66 over each set of openings 62. These baffles 64 are desirably inclined in a direction to release the gases from the chamber in a direction counter to that of the gas flow in the passage, 32 or 34, from which the gases are released.

The burner 38 in the described apparatus is preferably a gaseous fuel-fired burner capable of generating a high temperature, high velocity flow of combustion gases at the burner outlet. One such burner found adequate for this purpose is as shown and described in U.S. Pat. No. 3,666,393. As shown in FIG. 2, such a burner 38 is operatively disposed adjacent one end of the chamber with its discharge end communicating with the passage 32 through an opening 72 in the end wall 24. Gases discharged from the burner 38 are caused to flow longitudinally of the passage 32 where they are directed by the plates 39 at the opposite end into the passage 34 for return toward the burner and recirculation into the passage 32. The thermal effects of the flowing high temperature combustion gases on the side wall, end wall and floor plates, 22, 24 and 26 respectively, of the unit are reduced by the application of a heat insulating liner 74 (FIG. 4) along these members thereby permitting the utilization of less expensive, lower temperature resistant material for these members. The other metal components of the structure, however, are preferably formed of high temperature resistant steel alloys such as stainless steel, except for the cover plates 28 which, as mentioned, may desirably be formed of a lower cost heat resistant steel.

As the combustion gases circulate through the chamber along the passages 32 and 34, the cover plates 28 are heated to an elevated temperature, which may approach 1200° F. The heat absorbed by the plates 28 is radiated from the upper surface thereof to heat the underside of the hopper cars as they are slowly passed over the rails 12 through the thaw shed 14. The radiant heating effects of the plates 28 is augmented, as mentioned heretofore, by the release of combustion gas through the openings 62 at spaced locations along the gas flow path through the apparatus which results in an amount of convective heating of cars. Heating of the cars by convection may also occur by the ability of air to circulate around the apparatus 10 by virtue of its being supported in an elevated position upon the channels 18.

It will be appreciated that the gases flowing along the passage 32 will be at a somewhat higher temperature than those flowing along passage 34 thereby tending to create a slight heat unbalance between the two sides of the apparatus 10. In order to reduce such heat unbalance in the described apparatus the partition plate 30, about the midlength thereof, is provided with a vertically elongated opening 76 and arcuate baffle 78, coextensive with the opening, that is concave in the direction of flow of gas through the passage 32. As shown in FIG. 2, the baffle 78 is caused to extend outwardly from the partition into the passage 32 in order to divert a portion of the higher temperature gases flowing therein and short-circuiting the same into the lower temperature end of the passage 34. In this way, a more uniform distribution of heat is established along the length of the heating apparatus 10.

FIG. 6 illustrates schematically an installation utilizing heating apparatus of the hereindescribed type adapted to provide operational flexibility for meeting the varying requirements encountered in a thaw shed for thawing hopper car loads under diverse conditions. The shed 14, at about five to six hundred feet in length, can adequately contain strings of up to about twelve coupled hopper cars. A plurality of heating apparatus 10 as described herein are disposed in end-to-end relation between the rails 12 within the shed and are arranged in four zones, indicated in the drawing figure as A, B, C and D, respectively. Zone A, adjacent the entry end of the shed 14 is provided with eight functionally interconnected apparatus 10 with the remaining zones each containing six such apparatus. Each heater within the shed is provided with independent fuel and air supply means (not shown) operatively connected to the associated burner 38. Appropriate temperature responsive controls (also not shown) are connected to each of two thermocouple sensors, 80 and 82 in FIG. 2, to provide the desired operation. Sensor 80 is operatively disposed in a high temperature limit control system operative to actuate either a sensible warning signal or, alternatively, to terminate operation of the associated heater in the event of excessive temperature occurring therein. Sensor 82, on the other hand, is operatively connected in a zone regulator system for operating the fuel and air supply means associated with the respective heaters in each zone for controlling the heat generated by the burners 38 on a zone-average basis. Thus, heat emission in the respective regions of the thaw shed can be selectively controlled to most effectively thaw hopper car loads. All, or only some, of the zones can be rendered operational in response to system needs, thereby satisfying such needs in a fuel-efficient manner to keep operating costs to a minimum.

There is thus described an improved heating apparatus for application in railroad car thawing sheds designed for economy of installation and operation. The apparatus is constructed of a simple assemblage of metal plates and utilizes a low cost, fuel-fired heat source to deliver large amounts of heat in the form of radiant and convective energy. Moreover, and unlike comparable apparatus of the prior art, the effectiveness of the described heating apparatus does not deteriorate with prolonged use in the dirty environment in which it is utilized. On the contrary, being designed for the emission of radiant heat, the large surface areas presented by the cover plates more effectively radiate heat the closer they approach a "black body" with the accumulation of scale, rust and discoloration. The inclined heat radiating plates in covering the combustion chamber not only protect the operative parts of the heat source from damage caused by falling debris but also prevent the accumulation of such debris on the radiating surfaces that might otherwise reduce the effectiveness of the heater. Inclination of the plates in the manner described also directs the heat transmitted toward the outside of the bottom car and permits the use of laterally positioned reflective surfaces to enable the transmission of heat vertically along the upstanding side walls of the hopper cars thereby permitting the application of heat over more extensive areas to be heated. Also, because the cover plates are designed for ready removal not only is access to the burner and refractory liner for inspection and maintenance purposes facilitated but the plates themselves may be easily replaced in the event of damage or warpage.

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. Railroad car heating apparatus for disposition on a railroad between rails supported thereon, comprising
   (a) generally rectangularly arranged metal plates defining upstanding end and side walls of an elongated chamber adapted for reception between said rails, said metal plates including upwardly facing heat radiating cover plates extending transversely of said end and side walls, respectively, to form a roof substantially closing said chamber;
   (b) means forming an elongated partition wall positioned in spaced, parallel relation to said side walls and with opposite ends spaced from said end walls to divide said chamber into coextensive, parallel, interconnected passages;
   (c) a fuel-fired burner communicating with one of said passages and being operable for directing combustion gases through said chamber along recirculating flow paths through said passages.

2. Apparatus according to claim 1 in which said partition wall contains means intermediate its ends for short-circuiting combustion gases from one of said flow paths to the other.

3. Apparatus according to claim 2 in which said short-circuiting means includes an opening in said partition wall and a generally concave baffle associated with said opening for diverting at least part of the combustion gases from one of said flow paths to the other.

4. Apparatus according to claim 3 including means forming a heat insulating region extending parallel to said cover plates and substantially axially of the roof of said chamber.

5. Apparatus according to claim 3 including gas discharge openings disposed at longitudinally spaced locations in said cover plates for discharging heated combustion gases outwardly from said chamber passages.

6. Apparatus according to claim 5 including means forming baffles in superposed relation to said gas discharge openings for directing the gases exiting said chamber counter to the direction of gas flow along said flow paths through the respective passages.

7. Apparatus according to claim 3 including means forming an elongated heat insulating region in the roof of said chamber extending longitudinally thereof and intermediate the cover plates over the respective passages.

8. Apparatus according to claim 7 in which said heat insulating region is defined by an elongated trough fixedly attached to said chamber-forming plates and a body of refractory material seated in said trough.

9. Apparatus according to claim 8 in which said cover plates are inclined downwardly toward the compartment side walls.

10. Apparatus according to claim 7 in which said cover plates are removably attached to said walls of said chamber.

11. Railroad car heating apparatus for disposition on a railroad between rails supported thereon comprising
    (a) a plurality of metal plates defining the upstanding end, side and partition walls defining substantially coextensive, parallel gas flow passages interconnected at their ends for recirculation of combustion gases therethrough;
    (b) said passages being covered by upwardly facing heat radiating cover plates extending transversely of the sides of said passages and end to end thereof;
    (c) a fuel-fired burner communicating with one of said passages and operable to direct combustion gases therethrough along recirculating flow paths; and
    (d) a heat insulating region substantially coextensive with the length of said gas flow passages intermediate the cover plates over the respective passages.

* * * * *